United States Patent [19]

Anthonis

[11] 4,294,618

[45] Oct. 13, 1981

[54] SILICA-DOPED, CHROME-ALUMINA MONOLITHIC REFRACTORY COMPOSITIONS

[75] Inventor: Henry E. Anthonis, Annapolis, Md.

[73] Assignee: General Refractories Company, Bala Cynwyd, Pa.

[21] Appl. No.: 152,992

[22] Filed: May 27, 1980

[51] Int. Cl.$^3$ .................... C04B 35/10; C04B 35/12
[52] U.S. Cl. .................... 501/129; 501/132
[58] Field of Search .................... 106/66

[56] References Cited

U.S. PATENT DOCUMENTS

| | | | |
|---|---|---|---|
| B 502,773 | 1/1976 | Sowman | 106/66 |
| 2,965,505 | 12/1960 | Mikami | 106/66 |
| 3,060,043 | 10/1962 | Renkey | 106/64 |
| 3,075,848 | 1/1963 | Davies et al. | 106/58 |
| 3,208,861 | 9/1965 | Henry et al. | 106/57 |
| 3,361,584 | 1/1968 | Mayberry | 106/59 |
| 3,650,783 | 3/1972 | Yates | 106/69 |
| 3,862,845 | 1/1975 | Manigault | 106/66 |
| 3,888,687 | 6/1975 | Manigault | 106/66 |
| 3,948,670 | 4/1976 | Manigault | 106/66 |
| 4,039,344 | 8/1977 | Nishikawa et al. | 106/66 |
| 4,061,501 | 12/1977 | Ivarsson et al. | 106/68 |
| 4,149,899 | 4/1979 | Crookston | 106/66 |

*Primary Examiner*—James Poer
*Attorney, Agent, or Firm*—Everett H. Murray, Jr.; Brian G. Brunsvold; Thomas L. Irving

[57] ABSTRACT

A monolithic refractory composition including from about 63% to about 90% by weight high purity $Al_2O_3$; from about 2% to 8% by weight crystalline silica having a particle size of $-200$ mesh; from about 2% to 6% by weight high purity $Cr_2O_3$; from about 1% to 8% by weight high purity kaolin clay having a particle size of $-10\mu$ (micron); and from about 5% to 15% by weight phosphate binder. About 1-5% water may be substituted for $Al_2O_3$. Preferably, the high purity $Al_2O_3$ is a mixture of tabular alumina and calcined alumina and the phosphate binder is $H_3PO_4$.

8 Claims, 4 Drawing Figures

LINEAR THERMAL EXPANSION
OF
THE PREFERRED EMBODIMENT

SILICA-DOPED, CHROME-ALUMINA MONOLITHIC REFRACTORY COMPOSITIONS

BACKGROUND OF THE INVENTION

This invention relates to monolithic refractory compositions. More specifically, the invention relates to silica-doped, chrome-alumina plastics and ramming mixes.

Specialty refractories, such as refractory plastics and ramming mixes cure to form monolithic, integral structures after application. Such plastics and ramming mixes are mixes of refractory grains and plastic clays or plasticizers from which a plastic mixture is formed by adding water. The differences between ramming mixes and refractory plastics are slight. Generally, such plastics have a higher plasticity than ramming mixes and can be installed without forms, whereas ramming mixes are installed behind forms. Thus, both mixtures can be used either to repair irregularly worn furnace lining or to form monolithic furnace walls in new installations.

In the past, workers in the art have utilized a number of chrome-alumina specialty products. These chrome-alumina specialties, which utilize high purity $Cr_2O_3$ and tabular alumina in conjunction with a phosphate biner and low levels of clay, provide high refractoriness and very good resistance to both acid and basic slags.

There is a need, however, to increase the strength of these refractories in the intermediate temperature range of 2,300° F. to 2,800° F. Below 2,300° F., the phosphate bond in these refractories provides adequate strength, whereas above 2,800° F., the $Cr_2O_3$-$Al_2O_3$ solid solution is sufficiently developed to provide sufficient strength. In the temperature range of 2,300° F. to 2,800° F., however, which is involved in a significant number of iron and steel making processes, the phosphate bond in these refractories appears to be partially lost and the $Cr_2O_3$-$Al_2O_3$ solid solution is not well developed.

Accordingly, workers in the art have sought improved chrome-alumina plastics and ramming mixes which, while retaining high refractoriness and good resistance to both acid and basic slags, also possess increased strength in the temperature range of 2,300°–2,800° F. The refractory compositions of the present invention, having good hot strength in the 2,300°–2,800° F. temperature range, as well as slag erosion resistance and resistance to iron oxide penetration, represent an important contribution to the art.

SUMMARY OF THE INVENTION

The present invention relates to a monolithic refractory composition comprising from about 63% to about 90% by weight high purity $Al_2O_3$; from about 2–8% by weight free crystalline silica having a particle size of −200 mesh; from about 2% to 6% by weight high purity $Cr_2O_3$ (chromic oxide); from about 1% to 8% by weight high purity kaolin clay having a particle size of −10μ (micron); and from about 5% to 15% by weight phosphate binder.

The invention is also directed to a monolithic refractory composition comprising from about 58–89% by weight high purity $Al_2O_3$; from about 2–8% by weight crystalline silica having a particle size of −200 mesh; from 2–6% by weight of high purity $Cr_2O_3$; from about 1–8% by weight high purity kaolin clay having a particle size of −10μ (micron); from about 5–15% by weight phosphate binder; and from about 1–5% by weight water.

In the compositions of the present invention, the high purity $Al_2O_3$ is selected from the group consisting of tabular alumina having particle sizes ranging from about −6 mesh to −325 mesh, calcined alumina having particle sizes of about −325 mesh, and mixtures thereof. Preferably, the phosphate binder is $H_3PO_4$.

DETAILED DESCRIPTION OF THE PREFERRED EMBODIMENTS

Figure 1:
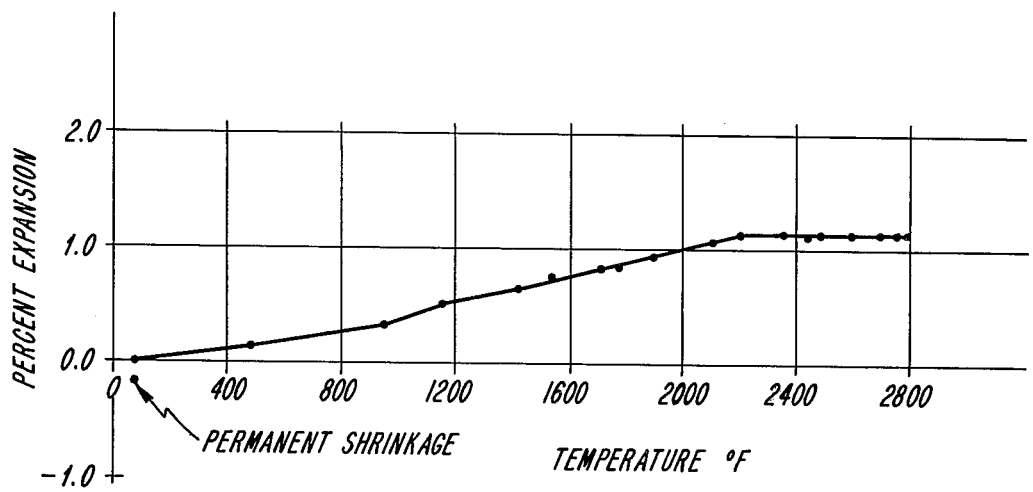
FIG. 1 represents linear thermal expansion data for the preferred refractory composition of the invention.

The high purity $Al_2O_3$ used in the present invention should be 99+% alumina and is preferably either tabular alumina or a mixture of tabular and calcined alumina. Tabular alumina is 99+% alumina sintered just below the fusion point of alumina (about 2,035° C.). Calcined alumina consists of small α-alumina crystallites, 1–10μ (micron) in size. Sources of both types of alumina are readily available commercially.

The high purity $Al_2O_3$ is preferably used in a variety of sizes ranging from −6 mesh to −325 mesh. When calcined alumina is employed, it is preferably added in particle sizes of −325 mesh.

Free crystalline silica is found in nature as quartz. In the present invention, it is preferred that free crystalline silica be used in an amount of from about 2–8% by weight and in sizes best described as −200 mesh. This percentage of sized free crystalline silica reacts in situ with the high purity alumina to form mullite, which consequently gives the monolithic refractory composition good hot strength in the temperature range of 2,300°–2,800° F. To avoid reduced acid slag erosion resistance, it is important that the upper range of crystalline silica not be exceeded.

The high purity chromic oxide ($Cr_2O_3$) used in the instant invention should be 95+% chromic oxide. The chromic oxide is preferably used in a variety of particle sizes ranging from −200 mesh to −325 mesh.

When used in a range of from about 2–6% by weight, the chromic oxide increases slag erosion resistance. When amounts of chromic oxide chosen from the upper portion of this range are added, increased resistance against iron oxide penetration, as well as further increased resistance to both basic and acidic slag erosion, are obtained. Preferably, the 6% upper limitation of chromic oxide should not be greatly exceeded because higher concentrations reduce the development of mullite, which reduction decreases hot strength in the 2,300°–2,800° F. range.

Kaolin is a white-burning aluminum silicate, which, due to its great purity, has a high fusion point and is the most refractory of all clays. The kaolin clay used in the present invention should be 95+% kaolin, and should have a particle size of −10μ (micron). An acceptable commercially available kaolin clay is AJAX P CLAY, purchased from GEORGIA KAOLIN COMPANY. Use of very fine, high purity kaolin clay reduces raw material costs and aids the development of hot strength.

Phosphate binders useful in the present invention include 75% $H_3PO_4$, 85% $H_3PO_4$ and mono aluminum phosphate. Preferably, the phosphate binder is $H_3PO_4$ of a purity of 75+%. The phosphate binder comprises from about 5–15%, preferably 8–15%, by weight of the monolithic refractory composition of the present invention. When amounts of phosphate binder selected from the upper portion of this range are used, increased ramming quality and slag erosion resistance are obtained.

The monolithic refractory compositions of the present invention may also contain from 1–5% by weight water. Thus, the inventive compositions may be marketed in the wet state.

A particularly preferred composition of the present invention contains: 45% by weight tabular alumina having a particle size of $-6+14$ mesh; 15% by weight tabular alumina having a particle size of $-14$ mesh; 15% by weight tabular alumina having a particle size of $-48$ mesh; 15% by weight calcined alumina having a particle size of $-325$ mesh; 5% by weight free crystalline silica having a particle size of $-200$ mesh; 5% by weight high purity kaolin clay having a particle size of $-10\mu$ (micron); 11.35% by weight of a phosphate binder containing 75% by weight $H_3PO_4$; and 5% by weight high purity $Cr_2O_3$.

The compositions of the present invention are prepared by thoroughly mixing a refractory batch comprising essentially the percentage weights of the components. After mixing, the product is shaped according to intended application and subsequently packaged.

The following discussion, merely illustrative of the invention, is not to be constructed as a limitation of the invention. Various other compositions, embodiments, modifications and equivalents will readily suggest themselves to those skilled in the art without departing from the spirit or scope of the present invention, particularly after such time as this patent issues.

As reported in Table 1, a limited number of tests, including hot modulus of rupture, deformation under load, slag erosion resistance and iron oxide penetration resistance were performed on compositions P1–P5 and R1–R11. In addition, high temperature reheats were made and ramming quality was evaluated. Many of the compositions in Table 1 are comparative—only R3, R4, R5 and R8 fall within the scope of the present invention.

Compositions P1–P3 are refractory plastics utilizing very limited quantities of $Cr_2O_3$ which are provided in a premixed liquid (Al 0.8Cr 3P). The test results for P1–P3 indicate that very small amounts of $Cr_2O_3$ significantly reduce iron oxide penetration.

The test results for compositions P4 and P5 demonstrate that as $Cr_2O_3$ is increased from 5% to 10% in the presence of 5% free crystalline silica, the 2,700° F. (1,480° C.) hot strength decreases. This phenomenon is also demonstrated in the test results for compositions R1–R9.

TABLE I

Chrome Alumina Compositions (ACP)
Selected High Temperature Physical Properties

| Component (Weight, %): | BRIKRAM 90R | P1 | P2 | P3 | P4 | P5 | R1 | R2 | R3 | R4 | R5 | R6 | R7 | R8 | R9 | R10 | R11 |
|---|---|---|---|---|---|---|---|---|---|---|---|---|---|---|---|---|---|
| Tabular Alumina, −6 + 14 mesh | 45 | 40 | 40 | 40 | 45 | 45 | 45 | 45 | 45 | 45 | 45 | 45 | 45 | 45 | 45 | 45 | 45 |
| Tabular Alumina, −14 mesh | 15 | 30 | 30 | 30 | 25 | 25 | 15 | 15 | 15 | 15 | 15 | 15 | 15 | 15 | 15 | 15 | 15 |
| Tabular Alumina, −48 mesh | 17 | — | — | — | — | — | 17 | 17 | 15 | 15 | 15 | 15 | 15 | 15 | 15 | 15 | 15 |
| Calcined Alumina, −325 mesh | 15 | 22 | 22 | 20 | 22 | 22 | 15 | 15 | 15 | 15 | 15 | 15 | 15 | 15 | 15 | 15 | 17 |
| Calcined Alumina, −65 mesh | — | — | 5 | 5 | — | — | — | — | — | — | — | — | — | — | — | — | — |
| Silica Flour, −200 mesh | 5 | 5 | — | 2 | 5 | 5 | 5 | 5 | 5 | 5 | 5 | 5 | 5 | 5 | 5 | 5 | 5 |
| Raw Kyanite, −100 mesh | — | — | — | — | — | — | — | — | — | — | — | — | — | — | — | — | — |
| Bentonite | 3 | 3 | 3 | 3 | 3 | 3 | 3 | 3 | — | — | — | — | — | — | — | — | — |
| AJAX P CLAY | — | — | — | — | — | — | — | — | — | — | — | — | — | — | — | — | — |
| 75% H₃PO₄ (ADDED) | 7 | 4.24 | 4.25 | 4.25 | 6.5 | 6.5 | 7 | 7 | 5 | 5 | 5 | 5 | 5 | 5 | 5 | 5 | 5 |
| Cr₂O₃ (ADDED) | — | .75 | .75 | .75 | 5 | 10 | 5 | 10 | 7 | 8 | 8 | 8 | 8 | 11.35 | 12.8 | 10.9 | 12.1 |
| Hydrated Alumina (ADDED) | — | — | — | — | — | — | — | — | 5 | 5 | 5 | 10 | 10 | 5 | 10 | 5 | 10.0 |
| Citric Acid (ADDED) | — | 1 | 1 | 1 | — | — | — | — | — | — | — | — | — | — | — | — | — |
| Water (ADDED) | — | 2 | 2 | 2 | — | — | — | — | — | — | 0.5 | — | 0.5 | — | — | — | — |
| | 1.5 | 4.2 | 4.7 | 4.9 | 1.6 | 1.6 | 1.6 | 1.6 | 1.2 | 1.5 | 1.5 | 2.2 | 2.2 | — | — | — | — |
| Hot Modulus of Rupture @: | | | | | | | | | | | | | | | | | |
| 2450° F. (1340° C.), psi | 2300 | 850 | 555 | 475 | 1070 | 1460 | — | — | — | — | — | — | — | — | — | — | — |
| MPa | 15.8 | 5.9 | 3.8 | 3.3 | 7.4 | 10.0 | — | — | — | — | — | — | — | — | — | — | — |
| 2700° F. (1480° C.), psi | 2350 | 1550 | 355 | 825 | 1030 | 340 | 1180 | 340 | 1900 | 2500+ | 2600+ | 1000 | 940 | 3240 | 690 | 1660 | 1280 |
| MPa | 16.2 | 10.7 | 2.4 | 5.7 | 7.1 | 2.3 | 8.1 | 2.3 | 13.1 | 7.2+ | 17.9+ | 6.9 | 6.5 | 22.3 | 4.8 | 11.4 | 8.8 |
| 3000° F. (1650° C.), psi | — | — | — | — | — | — | — | — | — | — | — | — | — | 325 | 375 | 250 | 160 |
| MPa | — | — | — | — | — | — | — | — | — | — | — | — | — | 2.2 | 2.6 | 1.7 | 1.1 |
| Deformation Under Load @: | | | | | | | | | | | | | | | | | |
| 2900° F. (1595° C.), 25 psi (172 kPa),% | 1–2* | — | — | — | — | — | Failed | Failed | 3.0 | 2.1 | 2.2 | 7.9 | Failed | 2.7 | — | 1.2 | 1.5 |
| Area Eroded by Slag, % | | | | | | | | | | | | | | | | | |
| B/A 0.8 | 15.4 | 10.6 | 21.3 | — | — | — | 25.5 | 16.5 | Failed | 18.5 | 23.0 | 15.9 | 17.4 | 13.4 | 10.7 | 13.3 | 10.2 |
| B/A 1.88 | 31.8 | — | — | — | — | — | — | — | — | 8.6 | — | — | 25.3 | 10.5 | 6.8 | 5.2 | 3.4 |
| B/A 0.17 | 23.7 | — | — | — | — | — | — | — | — | — | — | — | — | — | — | — | — |
| 3100° F. (1705° C.), 5 hours: | | | | | | | | | | | | | | | | | |
| Bulk Density, lb/ft³ | 189 | — | — | — | — | — | 178 | 179 | 178 | — | — | — | — | 176 | — | — | 194 |
| Mg/m³ | 3.03 | — | — | — | — | — | 2.85 | 2.87 | 2.85 | — | — | — | — | 2.82 | — | — | 3.10 |
| Linear Change, % | +1.0 | — | — | — | — | — | +1.6 | +2.1 | +0.9 | — | — | — | — | +0.5 | — | — | −0.6 |
| Cold Modulus of Rupture, psi | 2100 | — | — | — | — | — | — | — | — | — | — | — | — | 3540 | — | — | 485.0 |
| MPa | 14.5 | — | — | — | — | — | — | — | — | — | — | — | — | 24.4 | — | — | 33.4 |
| Iron Oxide Penetration Resistance: | Fair | Good | Good | Good | Excel | Excel | Excel | Excel | Excel | Excel | Excel | Excel | Excel | Excel | Excel | Excel | Excel |
| Ramming Quality: | Excel | Good | Good | — | — | — | Fair | Fair | Poor | Good | Good | Good | Good | Excel | Excel | Excel | Excel |

*Known to fail at 2550° F. (1400° C.).

R1 and R2 failed during load testing at the temperature of 2,900° F. (1,595° C.). These failures are believed to be related to the bentonite used in the matrix. The failure of R7 during load testing at 2,900° F. (1,595° C.) although not completely understood, is believed to result from the high amount (10%) of $Cr_2O_3$. The failure of R3 during slag testing is believed to be related to its poor ramming quality.

The slag erosion resistance of R1 through R9 improves as $H_3PO_4$ content increases and also as bentonite clay is replaced by high purity kaoline clay.

For those compositions having 5% $Cr_2O_3$, the hot strength at 2,700° F. (1,480° C.) increases as bentonite is replaced by high purity kaolin clay. Compositions with 10% $Cr_2O_3$ do not provide good hot strength at 2,700° F. (1,480° C.), as evidenced by the test results for P5, R2, R6, R7, R9 and R11.

Composition R8 presently represents the preferred embodiment of the invention. FIG. 1 presents linear thermal expansion data for R8. The chemical analysis of R8, on a calcined basis is $Al_2O_3 + Cr_2O_3$, 87.3%; $P_2O_5$, 5.7%; and other oxides, 7.0%. The fusion point is PCE 38+. Physical properties of R8, following firing and cooling, are presented in Table 2.

Field trials in a mag-carbon basic brick electric arc furnace roof delta section have been successful. The field trials of composition R8 were conducted in a large electric arc furnace.

TABLE 2

Physical Properties of the Preferred Embodiment After Firing and Cooling

| Hours | Temperature °F. | Temperature °C. | Modulus of Rupture psi | Modulus of Rupture MPa | Bulk Density lb/ft$^3$ | Bulk Density Mg/m$^3$ | Linear Change % | Open Porosity % |
|---|---|---|---|---|---|---|---|---|
| 24 | 450 | 230 | 2300 | 15.8 | 191 | 3.06 | — | — |
| 5 | 2500 | 1370 | 3100 | 21.2 | 190 | 3.04 | −0.03 | 11.4 |
| 5 | 2750 | 1510 | 5600 | 38.4 | 189 | 3.03 | +0.13 | 7.3 |
| 5 | 3000 | 1650 | 3500 | 24.0 | 184 | 2.95 | +0.74 | — |
| 5 | 3100 | 1705 | 3500 | 24.0 | 183 | 2.93 | +0.54 | — |

Deformation Under Load: After 2900° F. (1595° C.), 95 psi (172 kPa) −2.7%
Hot Modulus of Rupture: At 2450° F. (1345° C.) 2350 psi (16.1 MPa)
At 2700° F. (1480° C.) 3250 psi (22.3 MPa)
At 3000° F. (1650° C.) 325 psi (2.2 MPa)
Slag Erosion Resistance: Basic Slag - Excellent
Acid Slag - Excellent
Iron Oxide Penetration Resistance: Excellent
(2560° F. (1405° C.), $pO_2 = 10^{-6.8}$)

Prior to the use of composition R8, chrome-alumina mixes were used to upgrade the furnace roof delta sections. These products, however, did not provide the required service. Using composition R8, however, the delta section lasted long enough to justify economically the use of mag-carbon brick in the roof delta sections.

The structure of R8 are studied by polishing and examining petrographically various heat-treated samples. Specifically, samples of R8 were chosen for examination after 450° F. (203° C.) drying, 2,700° F. (1,480° C.) hot modulus of rupture analysis, and 3,000° F. (1,650° C.) hot modulus of rupture analysis.

Figure 2:
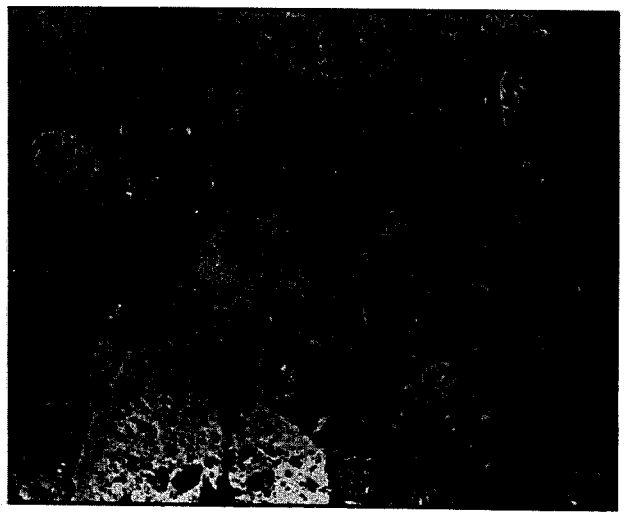
FIG. 2 shows a polished sample of the composition of FIG. 1 after 450° F. drying.
Figure 3:
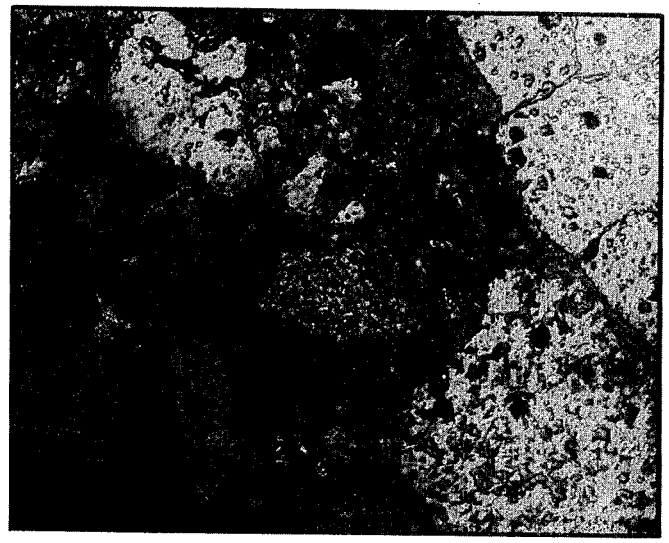
FIG. 3 shows a polished sample of the composition of FIG. 1 after 2,700° F. hot modulus of rupture analysis.

FIG. 2 shows R8 after the 450° F. drying. FIG. 3 shows R8 after 2,700° F. hot modulus of rupture analysis. Mullite development at the boundaries of the matrix and the tabular alumina grains is seen. This mullite, produced from the reaction of free crystalline silica and high purity alumina, does not appear green under crossed nicols, indicating that there is no solid solution of $Cr_2O_3$.

Figure 4:
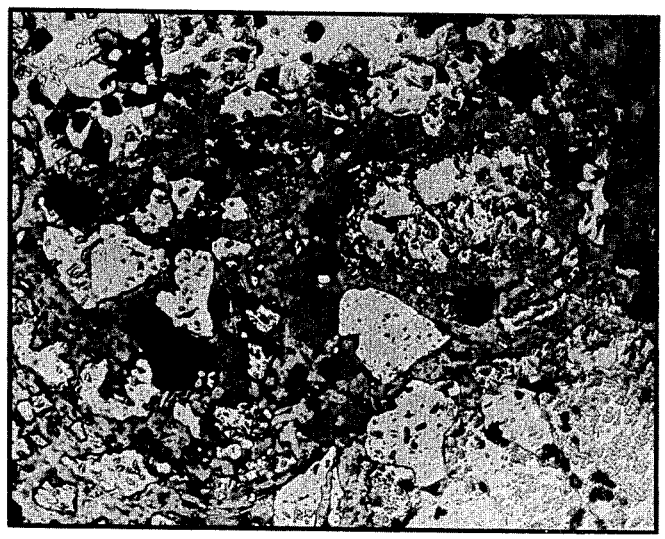
FIG. 4 shows a polished sample of the composition of FIG. 1 after 3,000° F. hot modulus of rupture analysis.

FIG. 4 shows composition R8 after 3,000° F. hot modulus of rupture analysis. The matrix is dominated by massive mullite crystals. The shape of the crystals indicates that they were not previously in a liquid state.

I claim:

1. A monolithic refractory composition comprising:
   from about 63% to 90% by weight high purity $Al_2O_3$;
   from about −2-8% by weight free crystalline silica having a particle size of −200 mesh;
   from about 2-6% by weight high purity of $Cr_2O_3$;
   from about 1-8% by weight high purity kaolin clay having a particle size of −10μ (micron); and
   from about 5-15% by weight phosphate binder.

2. The monolithic refractory composition of claim 1 wherein said high purity $Al_2O_3$ is selected from the group consisting of tubular alumina having particle sizes ranging from about −6 mesh to −325 mesh, calcined alumina having particle sizes of about −325 mesh, and mixtures thereof.

3. The composition of claim 1 wherein said phosphate binder is $H_3PO_4$.

4. A monolithic refractory composition comprising:
   from about 58-89% by weight high purity $Al_2O_3$;
   from about 2-8% by weight free crystalline silica having a particle size of −200 mesh;
   from about 2-6% by weight high purity $Cr_2O_3$;
   from about 1-8% by weight high purity kaolin clay having a particle size of −10μ (micron);
   from about 5-15% by weight phosphate binder; and
   from about 1-5% by weight water.

5. The composition of claim 4 wherein said high purity $Al_2O_3$ is selected from the group consisting of tubular alumina having particle sizes ranging from about −6 mesh to −325 mesh, calcined alumina having particle sizes of about −325 mesh, and mixtures thereof.

6. The composition of claim 4 wherein said phosphate binder is $H_3PO_4$.

7. A monolithic refractory composition comprising:
   45% by weight tabular alumina having a particle size of −6+14 mesh;
   15% by weight tabular alumina having a particle size of −14+48 mesh;
   15% by weight tabular alumina having a particle size of −48 mesh;
   15% by weight calcined alumina having a particle size of −325 mesh;
   5% by weight free crystalline silica having a particle size of −200 mesh;

5% by weight high purity kaolin clay having a particle size of $-10\mu$ (micron);

11.35% by weight of a phosphate binder containing 75% by weight $H_3PO_4$; and

5% by weight high purity $Cr_2O_3$.

8. A monolithic refractory composition comprising:

from about 63% to 90% by weight high purity $Al_2O_3$;

from about 2–8% by weight free crystalline silica having a particle size of $-200$ mesh;

from about 2–6% by weight high purity $Cr_2O_3$;

from about 1–8% by weight high purity kaolin clay having a particle size of $-10\mu$ (micron); and from about 5–15% by weight phosphate binder, wherein said monolithic refractory composition has a hot modulus of rupture at 2,700° F. of at least 1,900 p.s.i.

* * * * *

UNITED STATES PATENT AND TRADEMARK OFFICE
CERTIFICATE OF CORRECTION

PATENT NO. : 4,294,618
DATED : October 13, 1981
INVENTOR(S) : Henry E. Anthonis

It is certified that error appears in the above—identified patent and that said Letters Patent is hereby corrected as shown below:

Claim 1, line 8, change "-2-8%" to -- 2-8% --.

Claim 2, line 16, change "tubular" to --tabular--.

Signed and Sealed this

Twenty-ninth Day of December 1981

[SEAL]

Attest:

GERALD J. MOSSINGHOFF

Attesting Officer     Commissioner of Patents and Trademarks